US006895422B2

(12) United States Patent
Walster et al.

(10) Patent No.: US 6,895,422 B2
(45) Date of Patent: *May 17, 2005

(54) METHOD AND APPARATUS FOR COMPUTING ROOTS OF A POLYNOMIAL EQUATION WITH INTERVAL COEFFICIENTS

(75) Inventors: G. William Walster, Cupertino, CA (US); Eldon R. Hansen, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 557 days.

This patent is subject to a terminal disclaimer.

(21) Appl. No.: 09/952,760

(22) Filed: Sep. 13, 2001

(65) Prior Publication Data

US 2003/0055857 A1 Mar. 20, 2003

(51) Int. Cl.$^7$ ................................. G06F 7/38
(52) U.S. Cl. ......................................... 708/446
(58) Field of Search ......................... 708/446

(56) References Cited

U.S. PATENT DOCUMENTS

| | | | | |
|---|---|---|---|---|
| 5,008,672 A | * | 4/1991 | Leedy | 341/138 |
| 5,014,230 A | * | 5/1991 | Sinha et al. | 703/2 |
| 6,327,581 B1 | * | 12/2001 | Platt | 706/12 |
| 6,560,623 B1 | * | 5/2003 | Smith | 708/551 |
| 6,563,566 B2 | * | 8/2003 | Rosenbluth et al. | 355/67 |

OTHER PUBLICATIONS

E.R. Hansen, "Global Optimization Using Interval Analysis," Marcel Dekker, Inc., New York, NY, 1992.
R.B. Kearfott, "A Fortran 90 Environment for Research and Prototyping of Enclosure Algorithms for Nonlinear Equations and Global Optimization," ACM Transactions on Mathematical Software, vol. 21, No. 1, Mar 1995, pp. 63–78 http://interval.louisiana.edu/preprints.html.

(Continued)

*Primary Examiner*—Chuong Dinh Ngo
(74) *Attorney, Agent, or Firm*—Park, Vaughan & Fleming, LLP

(57) ABSTRACT

One embodiment of the present invention provides a system for finding the roots of a polynomial or a quadratic equation with interval coefficients. The system operates by receiving a representation of a polynomial equation, which can be a quadratic equation of the form $F(x)=Ax^2+Bx+C=0$, wherein $A=[A_L, A_U]$, $B=[B_L, B_U]$ and $C=[C_L, C_U]$ are interval coefficients. Next, the system computes intervals containing roots of the functions $F_1(x)$, $F_2(x)$, $F_3(x)$ and $F_4(x)$, wherein $F_1(x)=A_L x^2+B_L x+C_L$, $F_2(x)=A_U x^2+B_U x+C_U$, $F_3(x)=A_L x^2+B_U x+C_L$ and $F_4(x)=A_U x^2+B_L x+C_U$. The system then places the computed intervals into a list, L, and orders the computed intervals in L by their left endpoints, so that for a each entry, $S_i=[S_{iL}, S_{iU}]$, $S_{iL} \leq S_{i+1,L}$. Next, the system establishes interval roots for $F(x)$ from the interval entries in list L. In one embodiment of the present invention, establishing interval roots from the list L involves: establishing one interval root, $[S_{1,L}, S_{2U}]$, if L contains two entries, $S_1$ and $S_2$; establishing two interval roots, $[S_{1,L}, S_{2U}]$, and $[S_{3L}, S_{4U}]$, if L contains four entries, $S_1$, $S_2$, $S_3$ and $S_4$; and establishing three interval roots, $[-\infty, S_{2U}]$, $[S_{3L}, S_{4U}]$ and $[S_{5L}, +\infty]$, if L contains six entries, $S_1$, $S_2$, $S_3$, $S_4$, $S_5$ and $S_6$.

14 Claims, 7 Drawing Sheets

OTHER PUBLICATIONS

R.B. Kearfott, Algorithm 763: Interval Arithmetic: A Fortran 90 Module for an Interval Data Type, ACM Trans. Math. Software, 22, vol. 4, 1996, pp. 385–392. http://interval.louisiana.edu/preprints.html.

R.B. Kearfott and M. Novoa III, "Algorithm 681: INTBIS, A portable interval Newton/bisection package", ACM Trans. Math Software, vol. 16, No. 2, pp. 152–147. http://www.netlib.org/toms/681.

R.B. Kearfott, M. Dawande, K.S. Du, and C. Hu, "Algorithm 737: INTLIB: A Portable Fortran 737 Interval Standard Function Library," ACM Trans. Math. Software, 20, vol. 4, Dec. 1994, pp. 447–458.

R.B. Kearfott and G.W. Walster, "On Stopping Criteria in Verified Nonlinear Systems or Optimization Algorithms," ACM Trans. Math. Software, 26, vol. 3, Sep. 2000, pp. 323–351, The publication itself says Received: Jul. 1999; revised: Mar. 2000; accepted: Mar. 2000. http://interval.louisiana.edu/preprints.html.

R.E. Moore and S.T. Jones "Safe Starting Regions for Iterative Methods", SIAM Journal on Numerical Analysis, vol. 14, No. 6 (Dec. 1977), pp. 1051–1065.

A. Neumaier, "The Enclosure of Solutions of Parameter–Dependent Systems of Euqations," Cambridge University Press, Cambridge, 1990, ISBN: 0–12–505630–3, Reliability in Computing pp. 269–286.

S.M. Rump, "Verification Methods for Dense and Sparse Systems of Equations," in Topics in Validated Computations: Proceedings of the IMACS–GAMM International Workshop on Validated Computations, University of Oldenburg, J. Herzberger, ed., Elsevier Studies in Computational Mathematics, Elsevier, 1994, pp. 63–136.

\* cited by examiner $X \equiv [\underline{x}, \bar{x}] = \{x \in \Re^* | \underline{x} \leq x \leq \bar{x}\}$ $Y \equiv [\underline{y}, \bar{y}] = \{y \in \Re^* | \underline{y} \leq y \leq \bar{y}\}$ (1) $X + Y = [\downarrow \underline{x} + \underline{y}, \uparrow \bar{x} + \bar{y}]$ (2) $X - Y = [\downarrow \underline{x} - \bar{y}, \uparrow \bar{x} - \underline{y}]$ (3) $X \times Y = [\min(\downarrow \underline{x} \times \underline{y}, \underline{x} \times \bar{y}, \bar{x} \times \underline{y}, \bar{x} \times \bar{y}), \max(\uparrow \underline{x} \times \underline{y}, \underline{x} \times \bar{y}, \bar{x} \times \underline{y}, \bar{x} \times \bar{y})]$ (4) $X/Y = [\min(\downarrow \underline{x}/\underline{y}, \underline{x}/\bar{y}, \bar{x}/\underline{y}, \bar{x}/\bar{y}), \max(\uparrow \underline{x}/\underline{y}, \underline{x}/\bar{y}, \bar{x}/\underline{y}, \bar{x}/\bar{y})]$, if $0 \notin Y$ $X/Y \subseteq \Re^*$, if $0 \in Y$

METHOD AND APPARATUS FOR COMPUTING ROOTS OF A POLYNOMIAL EQUATION WITH INTERVAL COEFFICIENTS

BACKGROUND

1. Field of the Invention

The present invention relates to performing arithmetic operations on interval operands within a computer system. More specifically, the present invention relates to a method and an apparatus for using a computer system to find the roots of a polynomial equation with interval coefficients.

2. Related Art

Rapid advances in computing technology make it possible to perform trillions of computational operations each second. This tremendous computational speed makes it practical to perform computationally intensive tasks as diverse as predicting the weather and optimizing the design of an aircraft engine. Such computational tasks are typically performed using machine-representable floating-point numbers to approximate values of real numbers. (For example, see the Institute of Electrical and Electronics Engineers (IEEE) standard 754 for binary floating-point numbers.)

In spite of their limitations, floating-point numbers are generally used to perform most computational tasks.

One limitation is that machine-representable floating-point numbers have a fixed-size word length, which limits their accuracy. Note that a floating-point number is typically encoded using a 32, 64 or 128-bit binary number, which means that there are only $2^{32}$, $2^{64}$ or $2^{128}$ possible symbols that can be used to specify a floating-point number. Hence, most real number values can only be approximated with a corresponding floating-point number. This creates estimation errors that can be magnified through even a few computations, thereby adversely affecting the accuracy of a computation.

A related limitation is that floating-point numbers contain no information about their accuracy. Most measured data values include some amount of error that arises from the measurement process itself. This error can often be quantified as an accuracy parameter, which can subsequently be used to determine the accuracy of a computation. However, floating-point numbers are not designed to keep track of accuracy information, whether from input data measurement errors or machine rounding errors. Hence, it is not possible to determine the accuracy of a computation by merely examining the floating-point number that results from the computation.

Interval arithmetic has been developed to solve the above-described problems. Interval arithmetic represents numbers as intervals specified by a first (left) endpoint and a second (right) endpoint. For example, the interval [a, b], where a<b, is a closed, bounded subset of the real numbers, R, which includes a and b as well as all real numbers between a and b. Arithmetic operations on interval operands (interval arithmetic) are defined so that interval results always contain the entire set of possible values. The result is a mathematical system for rigorously bounding numerical errors from all sources, including measurement data errors, machine rounding errors and their interactions.

Note that the first endpoint normally contains the "infimum", which is the largest number that is less than or equal to each of a given set of real numbers. Similarly, the second endpoint normally contains the "supremum", which is the smallest number that is greater than or equal to each of the given set of real numbers. Also note that within the following disclosure, the infimum of an interval A can be represented as either $A_L$ or $\underline{A}$. Similarly, the supremum can be represented as either $A_U$ or $\overline{A}$.

When solving systems of nonlinear equations and optimization problems, we frequently want to compute the real roots of a polynomial equation in which the coefficients are intervals. These roots may be finite intervals, semi-infinite intervals, or the entire real line. A naïve procedure for determining the roots can be surprisingly complicated. Consider the quadratic equation $Ax^2+Bx+C=0$ where $A=[A_L, A_U]$, $B=[B_L, B_U]$ and $C=[C_L, C_U]$ are intervals. The interval roots of this quadratic equation are the set of real roots x of the quadratic equation $ax^2+bx+c=0$ for all $a \in A$, $b \in B$ and $c \in C$.

When the coefficients are degenerate intervals, we can express the roots as:

$$r \pm = \frac{-B \pm (B^2 - 4AC)^{1/2}}{2A}.$$

If we compute interval roots in this way, they are not sharp except in special cases. This is because the intervals A and B occur more than once in this expression and dependence causes loss of sharpness. It does not help to write the roots in the algebraically equivalent form $$r \pm = \frac{2C}{-B \pm (B^2 - 4AC)^{1/2}}.$$

What is needed is a method and an apparatus for computing the roots quadratic and polynomial equations with interval coefficients but without the problem of losing sharpness due to dependence.

SUMMARY

One embodiment of the present invention provides a system for finding the roots of a quadratic equation with interval coefficients. The system operates by receiving a representation of the quadratic equation of the form $F(x)=Ax^2+Bx+C=0$, wherein $A=[A_L, A_U]$, $B=[B_L, B_U]$ and $C=[C_L, C_U]$ are interval coefficients. Next, the system computes intervals containing roots of the functions $F_1(x)$, $F_2(x)$, $F_3(x)$ and $F_4(x)$, wherein $F_1(x)=A_Lx^2+B_Lx+C_L$, $F_2(x)=A_Ux^2+B_Ux+C_U$, $F_3(x)=A_Lx^2+B_Ux+C_L$ and $F_4(x)=A_Ux^2+B_Lx+C_U$. The system then places the computed intervals into a list, L, and orders the computed intervals in L by their left endpoints, so that for a each entry, $S_i=[S_{iL}, S_{iU}]$, $S_{iL} \leq S_{i+1,L}$. Next, the system establishes interval roots for $F(x)$ from the interval entries in list L.

In one embodiment of the present invention, establishing interval roots from the list L involves: establishing one interval root, $[S_{1L}, S_{2U}]$, if L contains two entries, $S_1$ and $S_2$; establishing two interval roots, $[S_{1L}, S_{2U}]$, and $[S_{3L}, S_{4U}]$, if L contains four entries, $S_1$, $S_2$, $S_3$ and $S_4$; and establishing three interval roots, $[-\infty, S_{2U}]$, $[S_{3L}, S_{4U}]$ and $[S_{5L}, +\infty]$, if L contains six entries, $S_1$, $S_2$, $S_3$, $S_4$, $S_5$ and $S_6$.

In one embodiment of the present invention, placing the computed intervals into the list, L, generally involves entering a double root twice, unless $C_L=0$, in which case the root of $F_1(x)$ and $F_3(x)$ at x=0 is entered only once, and unless $C_U=0$, in which case the root of $F_2(x)$ and $F_4(x)$ at x=0 is entered only once.

In one embodiment of the present invention, if $A_L<0$, or if $A_L=0$ and $B_U>0$, or if $A_L=0$ and $B_U=0$ and $C_L\leq 0$, the system places $-\infty$ into the list L. Furthermore, if $A_L<0$, or if $A_L=0$ and $B_L>0$, or if $A_L=0$ and $B_L=0$ and $C_L\leq 0$, the system places $+\infty$ into the list L.

In one embodiment of the present invention, the system determines if a first special case holds in which, $A\geq 0$, $B\leq 0$, $C\geq 0$ and $B^2-4AC\geq 0$. If so, the system computes the interval roots as $(-B+(B^2-4AC)^{1/2})/2A$ and $2C/(-B+(B^2-4AC)^{1/2})$.

In one embodiment of the present invention, the system determines if a second special case holds in which, $A\geq 0$, $B\geq 0$, $C\geq 0$ and $B^2-4AC\geq 0$. If so, the system computes the interval roots as $(-B-(B^2-4AC)^{1/2})/2A$ and $2C/(B(B^24AC)^{1/2})$.

One embodiment of the present invention provides a system for finding the roots of a polynomial equation with interval coefficients. The system operates by receiving a representation of the polynomial equation of the form $F(x)=\Sigma_{k=0 \text{ to } n}(A_k x^k)$, wherein each $A_{k=[A_{kL}, A_{kU}]}$ is an interval coefficient. Next, the system computes intervals containing roots of the functions $F_1(x)$, $F_2(x)$, $F_3(x)$ and $F_4(x)$, wherein $F_1(x)=\Sigma_{k=0 \text{ to } n}(A_{kL}x^k)$, $F_2(x)=\Sigma_{k=0 \text{ to } n}(A_{kU}x^k)$, $F_3(x)=\Sigma_{k=0 \text{ to } [n/2]}(A_{2kL}x^{2k})+\Sigma_{k=0 \text{ to } [(n-1)/2]}(A_{(2k+1)U}x^{2k+1})$, and $F_4(x)=\Sigma_{k=0 \text{ to } [n/2]}(A_{2kU}x^{2k})+\Sigma_{k=0 \text{ to } [(n-1)/2]}(A_{(2k+1)L}x^{2k+1})$.

The system then places the computed intervals into a list, L, and then orders the computed intervals in L by the left endpoints so that for a each entry, $S_i=[S_{iL}, S_{iU}]$, $S_{iL}\leq S_{i+1,L}$. Next, the system establishes interval roots for F(x) from the interval entries in list L.

BRIEF DESCRIPTION OF THE FIGURES

FIG. 5 illustrates four different interval operations in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer System

Figure 1:
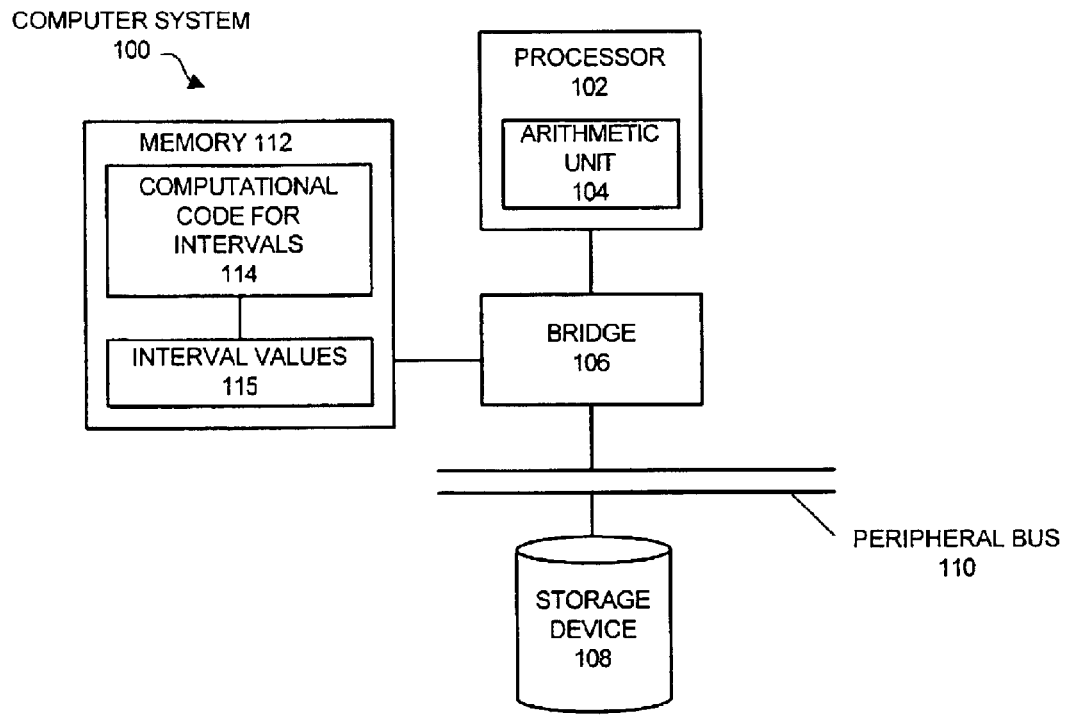
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and a to peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes an arithmetic unit 104, which is capable of performing computational operations using floating-point numbers.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102. As illustrated in FIG. 1, memory 112 contains computational code for intervals 114. Computational code 114 contains instructions for the interval operations to be performed on individual operands, or interval values 115, which are also stored within memory 112. This computational code 114 and these interval values 15 are described in more detail below with reference to FIGS. 2–5.

Note that although the present invention is described in the context of computer system 100 illustrated in FIG. 1, the present invention can generally operate on any type of computing device that can perform computations involving floating-point numbers. Hence, the present invention is not limited to the computer system 100 illustrated in FIG. 1.

Compiling and Using Interval Code

Figure 2:
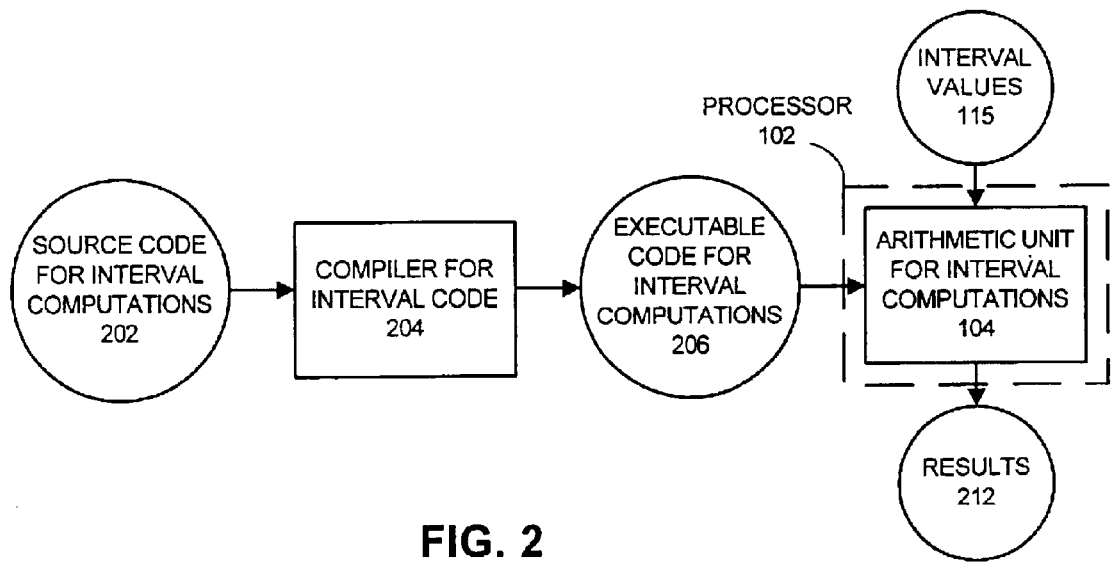
FIG. 2 illustrates the process of compiling and using code for interval computations in accordance with an embodiment of the present invention.

FIG. 2 illustrates the process of compiling and using code for interval computations in accordance with an embodiment of the present invention. The system starts with source code 202, which specifies a number of computational operations involving intervals. Source code 202 passes through compiler 204, which converts source code 202 into executable code form 206 for interval computations. Processor 102 retrieves executable code 206 and uses it to control the operation of arithmetic unit 104.

Processor 102 also retrieves interval values 115 from memory 112 and passes these interval values 115 through arithmetic unit 104 to produce results 212. Results 212 can also include interval values.

Note that the term "compilation" as used in this specification is to be construed broadly to include pre-compilation and just-in-time compilation, as well as use of an interpreter that interprets instructions at run-time. Hence, the term "compiler" as used in the specification and the claims refers to pre-compilers, just-in-time compilers and interpreters.

Arithmetic Unit for Intervals

Figure 3:
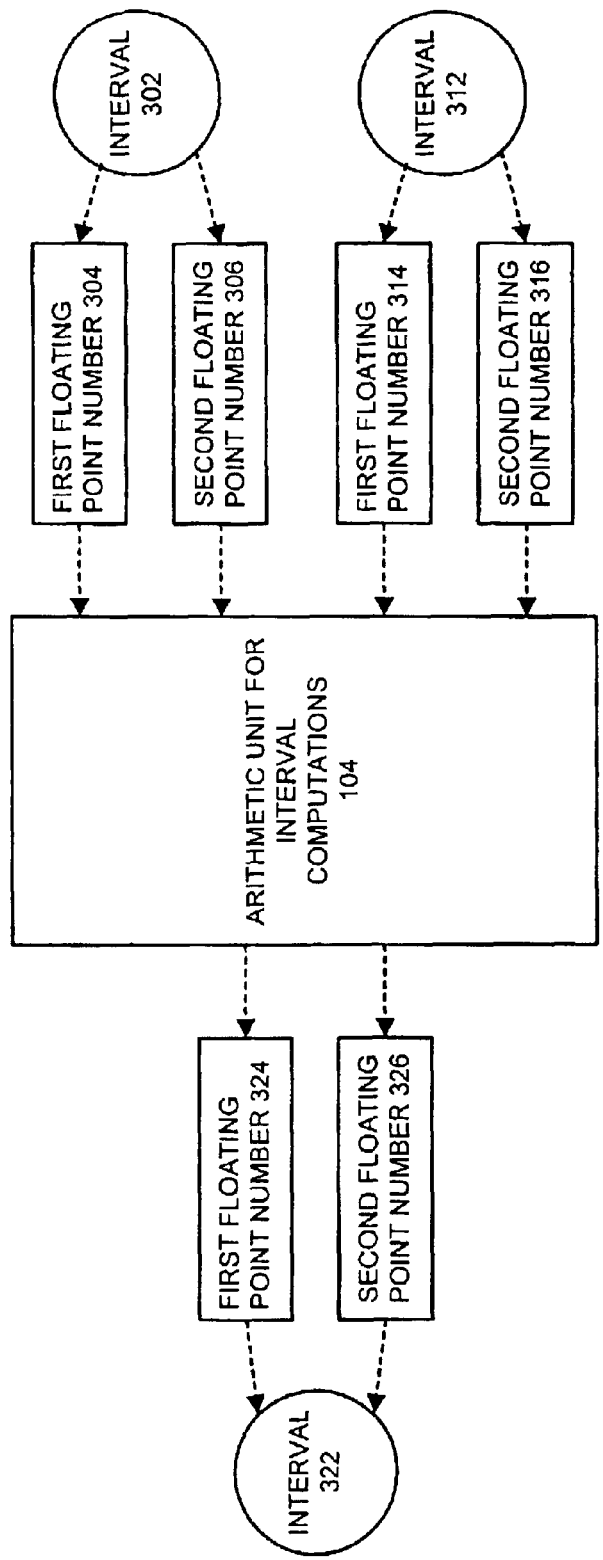
FIG. 3 illustrates an arithmetic unit for interval computations in accordance with an embodiment of the present invention.

FIG. 3 illustrates arithmetic unit 104 for interval computations in more detail accordance with an embodiment of the present invention. Details regarding the construction of such an arithmetic unit are well known in the art. For example, see U.S. Pat. Nos. 5,687,106 and 6,044,454, which are hereby incorporated by reference in order to provide details on the construction of such an arithmetic unit. Arithmetic unit 104 receives intervals 302 and 312 as inputs and produces interval 322 as an output.

In the embodiment illustrated in FIG. 3, interval 302 includes a first floating-point number 304 representing a first endpoint of interval 302, and a second floating-point number 306 representing a second endpoint of interval 302. Similarly, interval 312 includes a first floating-point number 314 representing a first endpoint of interval 312, and a second floating-point number 316 representing a second endpoint of interval 312. Also, the resulting interval 322 includes a first floating-point number 324 representing a first endpoint of interval 322, and a second floating-point number 326 representing a second endpoint of interval 322.

Note that arithmetic unit 104 includes circuitry for performing the interval operations that are outlined in FIG. 5. This circuitry enables the interval operations to be performed efficiently.

However, note that the present invention can also be applied to computing devices that do not include special-purpose hardware for performing interval operations. In such computing devices, compiler 204 converts interval operations into a executable code that can be executed using standard computational hardware that is not specially designed for interval operations.

Figure 4:
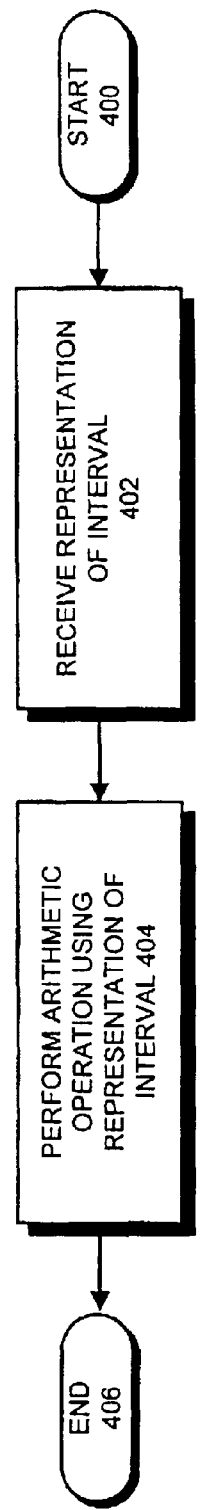
FIG. 4 is a flow chart illustrating the process of performing an interval computation in accordance with an embodiment of the present invention.

FIG. 4 is a flow chart illustrating the process of performing an interval computation in accordance with an embodiment of the present invention. The system starts by receiving a representation of an interval, such as first floating-point number 304 and second floating-point number 306 (step 402). Next, the system performs an arithmetic operation using the representation of the interval to produce a result (step 404). The possibilities for this arithmetic operation are described in more detail below with reference to FIG. 5.

Interval Operations

FIG. 5 illustrates four different interval operations in accordance with an embodiment of the present invention. These interval operations operate on the intervals X and Y. The interval X includes two endpoints, x̲ denotes the lower bound of X, and x̄ denotes the upper bound of X.

The interval X is a closed subset of the extended (including $-\infty$ and $+\infty$) real numbers R* (see line 1 of FIG. 5). Similarly the interval Y also has two endpoints and is a closed subset of the extended real numbers R* (see line 2 of FIG. 5).

Note that an interval is a point or degenerate interval if X=[x, x]. Also note that the left endpoint of an interior interval is always less than or equal to the right endpoint. The set of extended real numbers, R* is the set of real numbers, R, extended with the two ideal points negative infinity and positive infinity:

$$R^* = R \cup \{-\infty\} \cup \{+\infty\}.$$

In the equations that appear in FIG. 5, the up arrows and down arrows indicate the direction of rounding in the next and subsequent operations. Directed rounding (up or down) is applied if the result of a floating-point operation is not machine-representable.

The addition operation X+Y adds the left endpoint of X to the left endpoint of Y and rounds down to the nearest floating-point number to produce a resulting left endpoint, and adds the right endpoint of X to the right endpoint of Y and rounds up to the nearest floating-point number to produce a resulting right endpoint.

Similarly, the subtraction operation X−Y subtracts the right endpoint of Y from the left endpoint of X and rounds down to produce a resulting left endpoint, and subtracts the left endpoint of Y from the right endpoint of X and rounds up to produce a resulting right endpoint.

The multiplication operation selects the minimum value of four different terms (rounded down) to produce the resulting left endpoint. These terms are: the left endpoint of X multiplied by the left endpoint of Y; the left endpoint of X multiplied by the right endpoint of Y; the right endpoint of X multiplied by the left endpoint of Y; and the right endpoint of X multiplied by the right endpoint of Y. This multiplication operation additionally selects the maximum of the same four terms (rounded up) to produce the resulting right endpoint.

Similarly, the division operation selects the minimum of four different terms (rounded down) to produce the resulting left endpoint. These terms are: the left endpoint of X divided by the left endpoint of Y; the left endpoint of X divided by the right endpoint of Y; the right endpoint of X divided by the left endpoint of Y; and the right endpoint of X divided by the right endpoint of Y. This division operation additionally selects the maximum of the same four terms (rounded up) to produce the resulting right endpoint. For the special case where the interval Y includes zero, X/Y is an exterior interval that is nevertheless contained in the interval R*.

Note that the result of any of these interval operations is the empty interval if either of the intervals, X or Y, are the empty interval. Also note, that in one embodiment of the present invention, extended interval operations never cause undefined outcomes, which are referred to as "exceptions" in the IEEE 754 standard.

Computing Interval Roots for a Quadratic Function

Figure 6:
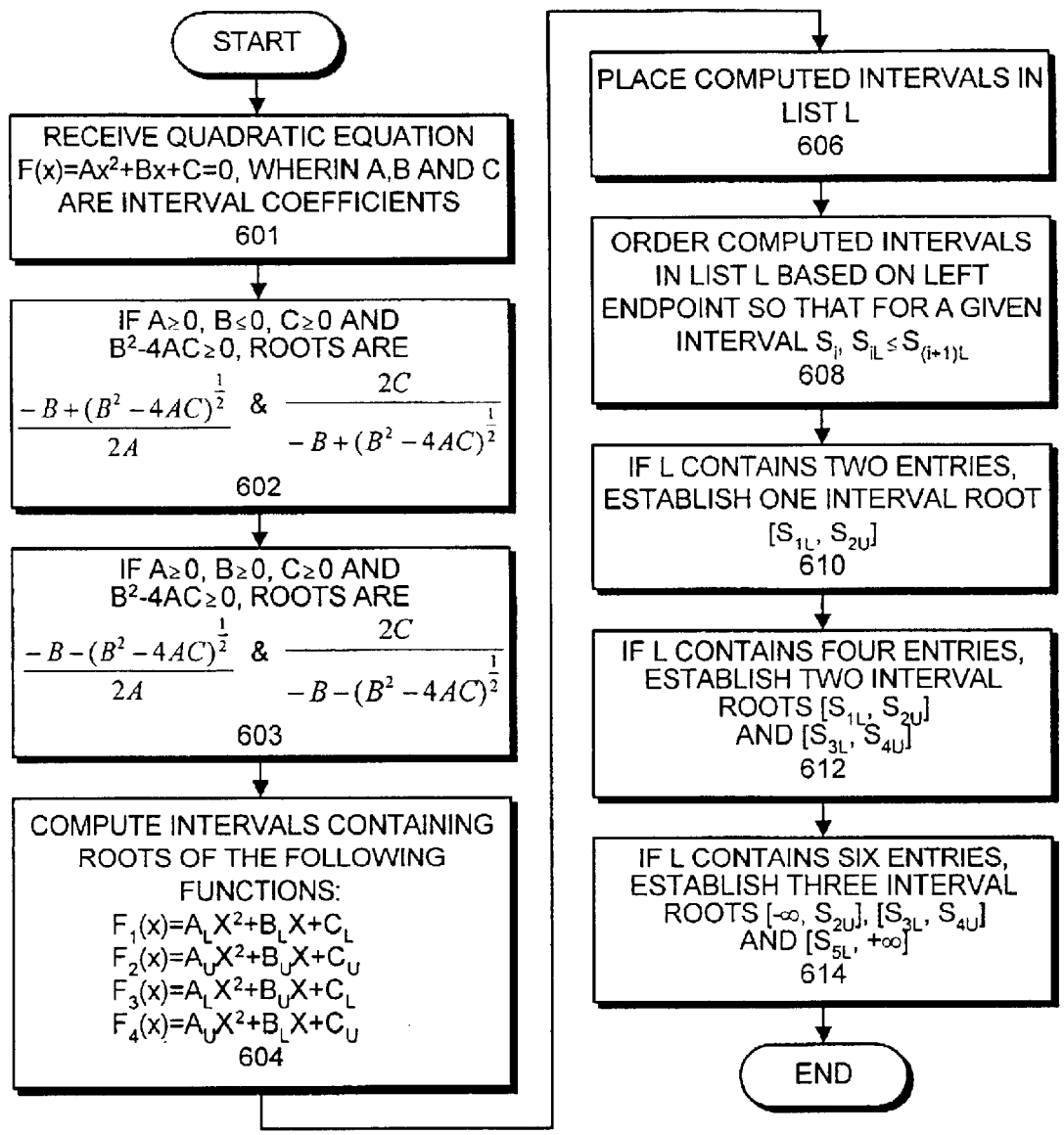
FIG. 6 illustrates the process of computing the interval roots for a quadratic function in accordance with an embodiment of the present invention.

FIG. 6 illustrates the process of computing the interval roots of a quadratic function in accordance with an embodiment of the present invention. The system first receives a representation of a quadratic equation $Ax^2+Bx+C=0$ with interval coefficients $A=[A_L, A_U]$, $B=[B_L, B_U]$ and $C=[C_L, C_U]$ (step 601).

Next, the system determines if a first special case holds in which, $A \geq 0$, $B \leq 0$, $C \geq 0$ and $B^2-4AC \geq 0$. If so, the system computes the interval roots directly as $(-B+(B^2-4AC)^{1/2})/2A$ and $2C/(-B+(B^2-4AC)^{1/2})$ (step 602).

Next, the system determines if a second special case holds in which, $A \geq 0$, $B \geq 0$, $C \geq 0$ and $B^2-4AC \geq 0$. If so, the system computes to interval roots directly as $(-B-(B^2-4AC)^{1/2})/2A$ and $2C/(-B-(B^2-4AC)^{1/2})$ (step 603).

If neither the first special case nor the second special case holds, the system computes intervals containing roots of the following four equations (step 604):

$F_1(x) = A_L x^2 + B_L x + C_L;$ $F_2(x) = A_U x^2 + B_U x + C_U;$ $F_3(x) = A_L x^2 + B_U x + C_L;$ and $F_4(x) = A_U x^2 + B_L x + C_U.$ Note that $Ax^2 = [A_L x^2, A_U x^2]$. Furthermore, note that $Bx = [B_L x, B_U x]$ if $x \geq 0$, and $Bx = [B_U x, B_L x]$ if $x \leq 0$. Hence, we can rewrite $F(x)$ as $[F_1(x), F_2(x)] = 0$ when $x \geq 0$, and $[F_3(x), F_4(x)] = 0$ when $x \leq 0$.

Next, the system places the computed intervals into a list L (step 606). In doing so, the system enters a double root twice, unless $C_L = 0$, in which case the root of $F_1(x)$ and $F_3(x)$ at $x=0$ is entered only once, and unless $C_U = 0$, in which case the root of $F_2(x)$ and $F_4(x)$ at $x=0$ is entered only once. Furthermore, if $A_L < 0$, or if $A_L = 0$, and $B_U > 0$, or if $A_L = 0$ and $B_U = 0$ and $C_L \leq 0$, the system places $-\infty$ into L. Similarly, if $A_L < 0$, or if $A_L = 0$ and $B_L > 0$, or if $A_L = 0$ and $B_L = 0$ and $C_L \leq 0$, the system places $+\infty$ into L.

The system then orders the computed intervals in L by the left endpoints so that for a each entry, $S_i = [S_{iL}, S_{iU}]$, $S_{iL} \leq S_{i+1,L}$ (step 608).

Next, the system establishes interval roots for $F(x)$ from the interval entries in L. If L contains two entries, $S_1$ and $S_2$, the system establishes one interval root, $[S_{1,L}, S_{2U}]$ (step 610). If L contains four entries, $S_1, S_2, S_3$ and $S_4$, the system establishes two interval roots, $[S_{1,L}, S_{2U}]$, and $[S_{3L}, S_{4U}]$ (step 612). Finally, if L contains six entries, $S_1, S_2, S_3, S_4, S_5$ and $S_6$, the system establishes three interval roots, $[-\infty, S_{2U}]$, $[S_{3L}, S_{4U}]$ and $[S_{5L}, +\infty]$ (step 614).

Example Functions

Figure 7:
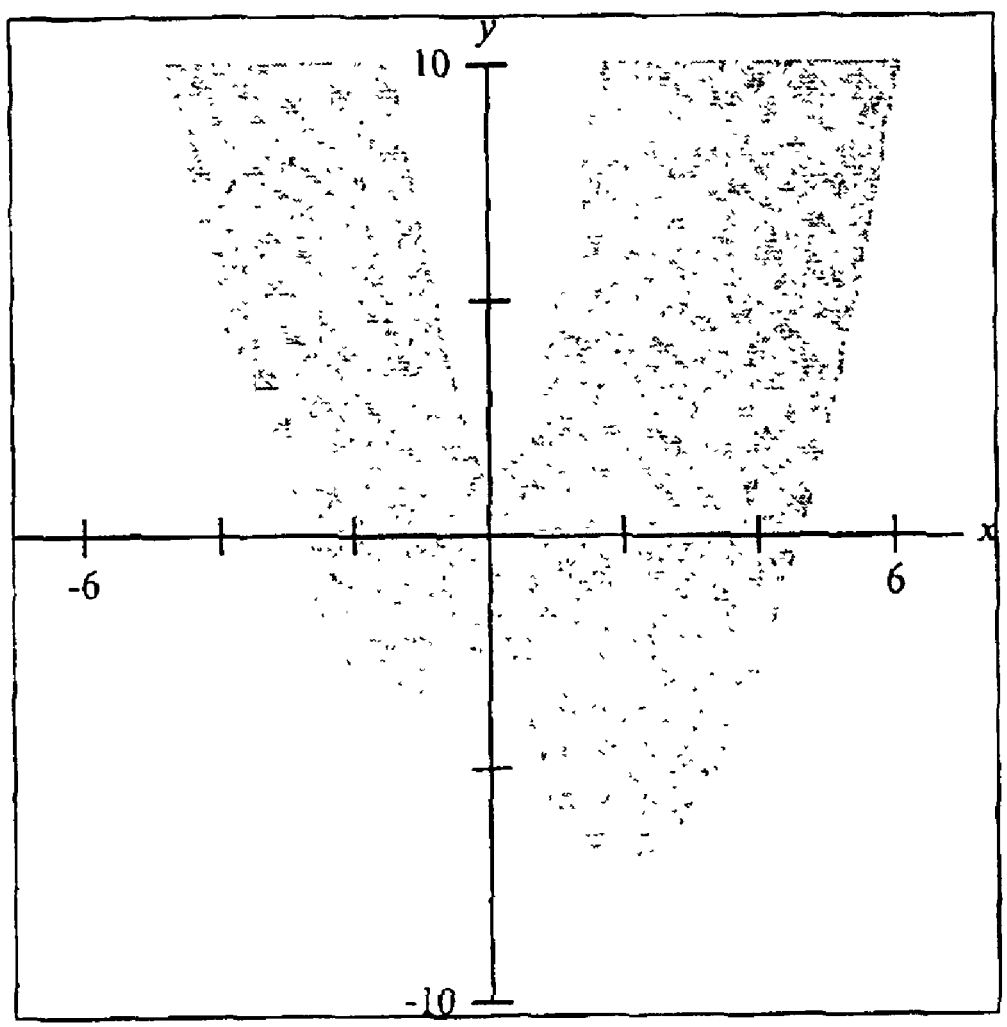
FIG. 7 is a graph of a quadratic function with interval coefficients in accordance with an embodiment of the present invention.

FIG. 7 illustrates an exemplary quadratic function with interval coefficients $F(x) = Ax^2 + Bx + C$ in accordance with an embodiment of the present invention. In this example, the interval coefficients A, B, and C have the following values $A = [1,2]$, $B = [-4,2]$ and $C = [-3,1]$. Note that if $x < 0$, the equation $F(x)$ can be rewritten as $[F_3(x), F_4(x)] = [x^2 + 2x - 3, 2x^2 - 4x + 1] = 0$. Similarly, if $x \geq 0$, the equation $F(x)$ can be rewritten as $[F_1(x), F_2(x)] = [x^2 - 4x - 3, 2x^2 + 2x + 1] = 0$.

Figure 8:
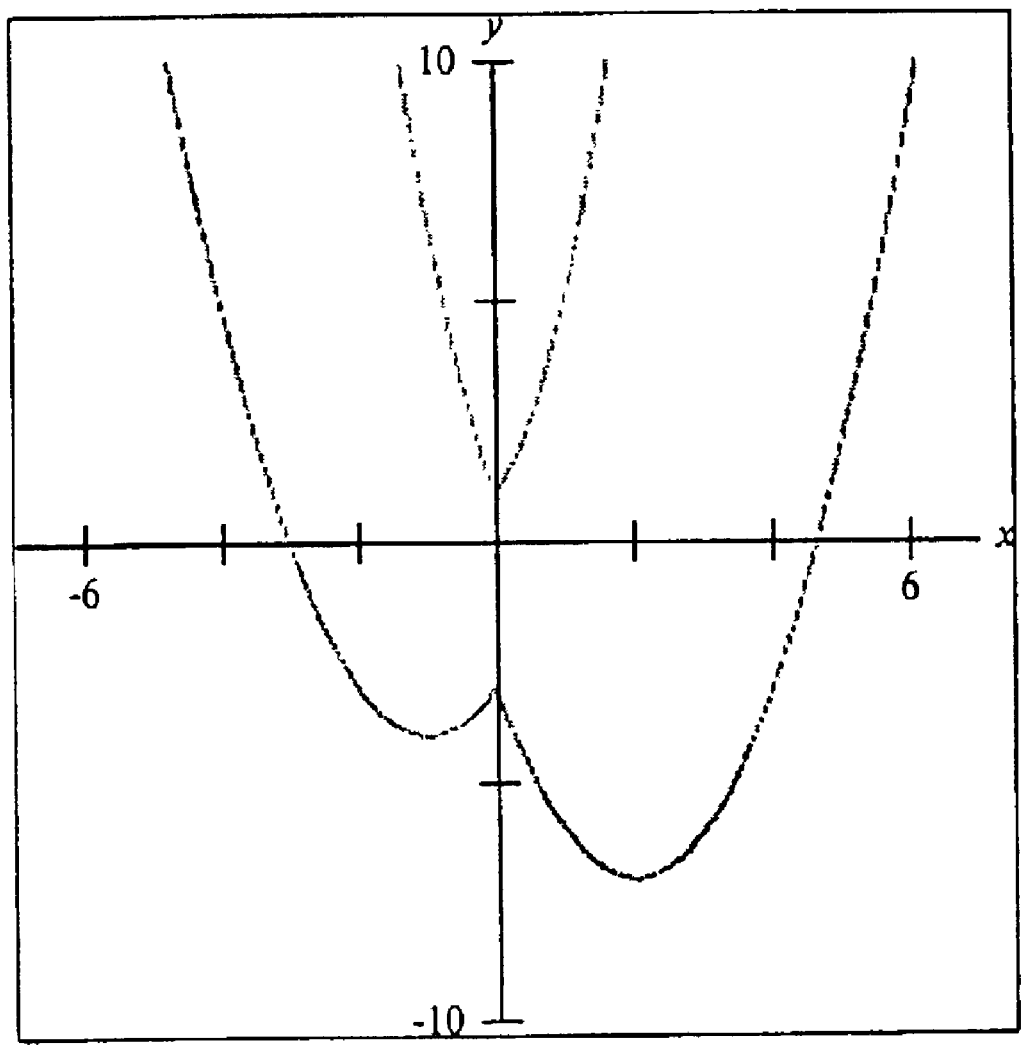
FIG. 8 illustrates the upper and lower boundaries of the quadratic function illustrated in FIG. 7 in accordance with an embodiment of the present invention.

FIG. 8 illustrates the lower and upper boundaries of the quadratic function $F(x)$ illustrated in FIG. 7 in accordance with an embodiment of the present invention. Note that if $x \geq 2$, the lower boundary $F_L(x) = F_1(x)$. Otherwise, if $x \leq 0$, $F_L(x) = F_3(x)$. Similarly, if $x \geq 0$, the upper boundary $F_U(x) = F_2(x)$. Otherwise, if $x \leq 0$, $F_U(x) = F_4(x)$.

Figure 9:
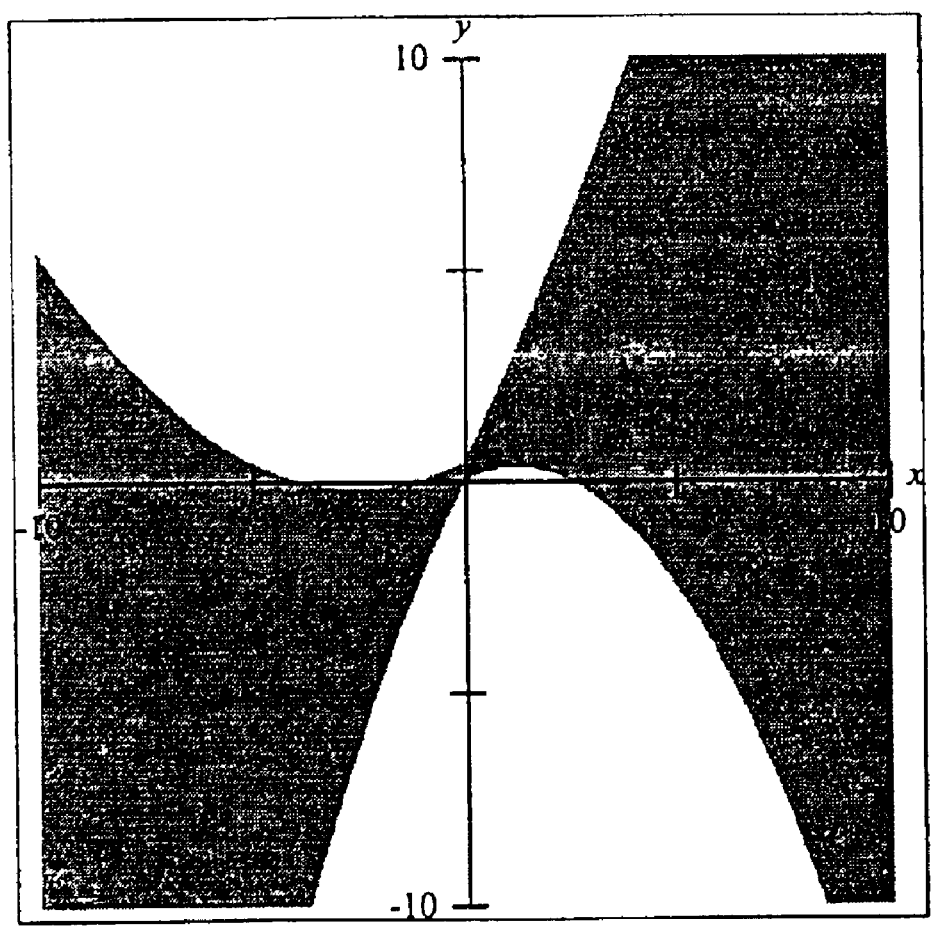
FIG. 9 illustrates an exemplary function with three interval roots in accordance with an embodiment of the present invention.

Note that the function $F(x)$ illustrated in FIG. 7 has two disjoint interval roots where the function touches the horizontal axis. One interval root is to the right of the vertical axis and the other interval root is to the left of the vertical axis. Similar to a non-interval quadratic, there may be no such interval root, there may be only one multiple root or there may be two disjoint roots as is illustrated in FIG. 7. The interval case differs from the non-interval case in that there may be three such disjoint interval roots. However, in the latter case, one interval root extends to $-\infty$ and another extends to $+\infty$. Thus, we can think of these two interval roots as joined at projective infinity to form a single interval. FIG. 9 illustrates this situation.

Extension to Higher Order Polynomials

Note that the methodology described above can be applied to compute the real interval roots of a polynomial with interval coefficients of any degree.

Denote an interval polynomial by $F(x) = \Sigma_{k=0 \text{ to } n} (A_k x^k)$. The functions $F_1(x), F_2(x), F_3(x)$ and $F_4(x)$ now become:

$F_1(x) = \Sigma_{k=0 \text{ to } n} (A_{kL} x^k);$ $F_2(x) = \Sigma_{k=0 \text{ to } n} (A_{kU} x^k);$ $F_3(x) = \Sigma_{k=0 \text{ to } [n/2]} (A_{2kL} x^{2k}) + \Sigma_{k=0 \text{ to } [(n-1)/2]} (A_{(2k+1)U} x^{2k+1});$ and $F_4(x) = \Sigma_{k=0 \text{ to } [n/2]} (A_{2kU} x^{2k}) + \Sigma_{k=0 \text{ to } [(n-1)/2]} (A_{(2k+1)L} x^{2k+1});$ where $[n/2]$ is the integer part of $n/2$, and $[(n-1)/2]$ is the integer part of $[(n-1)/2]$.

As in the quadratic case, we put the non-negative roots of $F_1(x)$ and $F_2(x)$ and the non-positive roots of $F_3(x)$ and $F_4(x)$ into a list L. Depending upon whether the degree of $F_1(x)$ is even or odd and depending on the sign of its leading coefficient, we can determine its behavior for large values of $|x|$. Therefore (as before), we can determine whether a root in the list L is a lower bound or an upper bound on an interval root. As in the quadratic case, this is simplified by assuming that $A_{nU} > 0$.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-readable storage medium storing instructions that when executed by a computer cause the computer to perform a method for finding the roots of a quadratic equation with interval coefficients, the method comprising:

receiving a representation of the quadratic equation of the form $F(x) = Ax^2 + Bx + C = 0$, wherein A, B and C are interval coefficients;

wherein A is represented by a floating-point number, $A_L$, for the left endpoint of A, and a floating-point number, $A_U$, for the right endpoint of A;

wherein B is represented by a floating-point number, $B_L$, for the left endpoint of B, and a floating-point number, $B_U$, for the right endpoint of B;

wherein C is represented by a floating-point number, $C_L$, for the left endpoint of C, and a floating-point number, $C_U$, for the right endpoint of C;

computing intervals containing roots of the functions $F_1(x), F_2(x), F_3(x)$ and $F_4(x)$, wherein $F_1(x) = A_L x^2 + B_L x + C_L$, $F_2(x) = A_U x^2 + B_U x + C_U$, $F_3(x) = A_L x^2 + B_U x + C_L$ and $F_4(x) = A_U x^2 + B_L x + C_U$;

placing the computed intervals into a list, L;

ordering the computed intervals in the list, L, so that a given entry, $S_i$, is represented by a floating-point number, $S_{iL}$, for the left endpoint of $S_i$, and a floating-point number, $S_{iU}$, for the right endpoint of $S_i$, and wherein $S_{iL} \leq S_{i+1,L}$; and establishing interval roots for $F(x)$ from the interval entries in list L.

2. The computer-readable storage medium of claim 1, wherein establishing interval roots for $F(x)$ from the list L involves:

establishing one interval root, $[S_{1,L}, S_{2U}]$, if L contains two entries, $S_1$ and $S_2$;

establishing two interval roots, $[S_{1,L}, S_{2U}]$, and $[S_{3L}, S_{4U}]$, if L contains four entries, $S_1, S_2, S_3$ and $S_4$; and establishing three interval roots, $[-\infty, S_{2U}]$, $[S_{3L}, S_{4U}]$ and $[S_{5L}, +\infty]$, if L contains six entries, $S_1, S_2, S_3, S_4, S_5$, and $S_6$.

3. The computer-readable storage medium of claim 1, wherein placing the computed intervals into the list, L, involves:

entering a double root twice;

unless $C_L=0$, in which case the root of $F_1(x)$ and $F_3(x)$ at x=0 is entered only once; and unless $C_U=0$, in which case the root of $F_2(x)$ and $F_4(x)$ at x=0 is entered only once.

4. The computer-readable storage medium of claim 1, wherein if $A_L<0$, or if $A_L=0$ and $B_U>0$, or if $A_L=0$ and $B_U=0$ and $C_L\leq 0$, the method further comprises placing $-\infty$ into the list L; and wherein if $A_L<0$, or if $A_L=0$ and $B_L>0$, or if $A_L>0$ and $B_L=0$ and $C_L\leq 0$, the method further comprises placing $+\infty$ into the list L.

5. The computer-readable storage medium of claim 1, wherein the method further comprises:

determining if a first special case holds in which, $A\geq 0$, $B\leq 0$, $C\geq 0$ and $B^2-4AC\geq 0$; and if the first special case holds, computing the interval roots as $(-B+(B^2-4AC)^{1/2})/2A$ and $2C/(-B+(B^2-4AC)^{1/2})$.

6. The computer-readable storage medium of claim 1, wherein the method further comprises:

determining if a second special case holds in which, $A\geq 0$, $B\geq 0$, $C\geq 0$ and $B^2-4AC\geq 0$; and if the second special case holds, computing the interval roots as $(-B-(B^2-4AC)^{1/2})/2A$ and $2C/(-B-(B^2-4AC)^{1/2})$.

7. A computer-controlled method for finding the roots of a polynomial equation with interval coefficients, comprising:

receiving a representation of the polynomial equation of the form $F(x)=\Sigma_{k=0\ to\ n}(A_k x^k)$;

wherein each $A_k$ is an interval coefficient represented by a floating-point number, $A_{kL}$, for the left endpoint of $A_k$, and a floating-point number, $A_{kU}$, for the right endpoint of $A_k$;

storing the representation in a computer memory;

computing intervals containing roots of the functions $F_1(x)$, $F_2(x)$, $F_3(x)$ and $F_4(x)$, wherein $F_1(x)=\Sigma_{k=0\ to\ n}(A_{kL}x^k)$, $F_2(x)=\Sigma_{k=0\ to\ n}(A_{kU}x^k)$, $F_3(x)=\Sigma_{k=0\ to\ [n/2]}(A_{2kL}x^{2k})+\Sigma_{k=0\ to\ [(n-1)/2]}(A_{(2k+1)U}x^{2k+1})$, and $F_4(x)=\Sigma_{k=0\ to\ [n/2]}(A_{2kU}x^{2k})+\Sigma_{k=0\ to\ [(n-1)/2]}(A_{2k+1)L}x^{2k+1})$;

placing the computed intervals into a list, L;

ordering the computed intervals in the list, L, so that a given entry, $S_i$, is represented by a floating-point number, $S_{iL}$, for the left endpoint of $S_i$ and a floating-point number, $S_{iU}$, for the right endpoint of $S_i$, and wherein $S_{iL}\leq S_{i+1,L}$; and establishing interval roots for F(x) from the interval entries in list L.

8. An apparatus that finds the roots of a quadratic equation with interval coefficients, comprising: a computer system;

a receiving mechanism within the computer system that is configured to receive a representation of the quadratic equation of the form $F(x)=Ax^2+Bx+C=0$, wherein A, B and C are interval coefficients;

wherein A is represented by a floating-point number, $A_L$, for the left endpoint of A, and a floating-point number, $A_U$, for the right endpoint of A;

wherein B is represented by a floating-point number, $B_L$, for the left endpoint of B, and a floating-point number, $B_U$, for the right endpoint of B;

wherein C is represented by a floating-point number, $C_L$, for the left endpoint of C, and a floating-point number, $C_U$, for the right endpoint of C;

a computing mechanism that is configured to compute intervals containing roots of the functions $F_1(x)$, $F_2(x)$, $F_3(x)$ and $F_4(x)$, wherein $F_1(x)=A_L x^2+B_L x+C_L$, $F_2(x)=A_U x^2+B_U x+C_U$, $F_3(x)=A_L x^2+B_U x+C_L$ and $F_4(x)=A_U x^2+B_L x+C_U$;

wherein the computing mechanism within the computer system is configured to place the computed intervals into a list, L;

an ordering mechanism within the computer system that is configured to order the computed intervals in the list, L, so that a given entry, $S_i$, is represented by a floating-point number, $S_{iL}$, for the left endpoint of $S_i$, and a floating-point number, $S_{iU}$, for the right endpoint of $S_i$, and wherein $S_{iL}\leq S_{i+1,L}$; and wherein the computing mechanism is configured to establish interval roots for F(x) from the interval entries in list L.

9. The apparatus of claim 8, wherein the computing mechanism is configured to:

establishing one interval root, $[S_{1L}, S_{2U}]$, if L contains two entries, $S_1$ and $S_2$;

establishing two interval roots, $[S_{1L}, S_{2U}]$, and $[S_{3L}, S_{4U}]$, if L contains four entries, $S_1$, $S_2$, $S_3$ and $S_4$; and establishing three interval roots, $[-\infty, S_{2U}]$, $[S_{3L}, S_{4U}]$ and $[S_{5L}, +\infty]$, if L contains six entries, $S_1$, $S_2$, $S_3$, $S_4$, $S_5$, and $S_6$.

10. The apparatus of claim 8, wherein while placing the computed intervals into the list, L, the computing mechanism is configured to:

enter a double root twice;

unless $C_L=0$, in which case the root of $F_1(x)$ and $F_3(x)$ at x=0 is entered only once; and unless $C_U=0$, in which case the root of $F_2(x)$ and $F_4 x)$ at x=0 is entered only once.

11. The apparatus of claim 8, wherein if $A_L<0$, or if $A_L=0$ and $B_U>0$, or if $A_L=0$ and $B_U=0$ and $C_L\leq 0$, the computing mechanism is configured to place $-\infty$ into the list L; and wherein if $A_L<0$, or if $A_L=0$ and $B_L>0$, or if $A_L=0$ and $B_L=0$ and $C_L\leq 0$, the computing mechanism is configured to place $+\infty$ into the list L.

12. The apparatus of claim 8, wherein the computing mechanism is configured to:

determine if a first special case holds in which, $A\geq 0$, $B\leq 0$, $C\geq 0$ and $B^2-4AC\geq 0$; and if the first special case holds, to compute the interval roots as $(-B+(B^2-4AC)^{1/2})/2A$ and $2C/(-B+(B^2-4AC)^{1/2})$.

13. The apparatus of claim 8, wherein the computing mechanism is configured to:

determine if a second special case holds in which, $A\geq 0$, $B\geq 0$, $C\geq 0$ and $B^2-4AC\geq 0$; and if the second special case holds, to compute the interval roots as $(-B-(B^2-4AC)^{1/2})/2A$ and $2C/(-B-(B^2-4AC)^{1/2})$.

14. An apparatus that finds the roots of a polynomial equation with interval coefficients, comprising:

a computer system;

a receiving mechanism within the computer system that is configured to receive a representation of the polynomial equation of the form $$F(x)=\Sigma_{k=0\ to\ n}(A_k x^k);$$

wherein each $A_k$ is an interval coefficient represented by a floating-point number, $A_{kL}$, for the left endpoint of $A_k$, and a floating-point number, $A_{kU}$, for the right endpoint of $A_k$;

a computing mechanism within the computer system that is configured to compute intervals containing roots of the functions $F_1(x)$, $F_2(x)$, $F_3(x)$ and $F_4(x)$, wherein $F_1(x)=\Sigma_{k=0 \ to \ n}(A_{kL}x^k)$, $F_2(x)=\Sigma_{k=0 \ to \ n}(A_{kU}x^k)$, $F_3(x)=\Sigma_{k=0 \ to \ [n/2]}(A_{2kL}x^{2k})+\Sigma_{k=0 \ to \ [(n-1)/2]}(A_{(2k+1)U}x^{2k+1})$, and $F_4(x)=\Sigma_{k=0 \ to \ [n/2]}(A_{2kU}x^{2k})+\Sigma_{k=0 \ to \ [(n-1)/2]}(A_{(2k+1)L}x^{2k+1})$;

wherein the computing mechanism is configured to place the computed intervals into a list, L;

an ordering mechanism within the computer system that is configured to order the computed intervals in the list, L, so that a given entry, $S_i$, is represented by a floating-point number, $S_{iL}$, for the left endpoint of $S_i$, and a floating-point number, $S_{iU}$, for the right endpoint of $S_i$, and wherein $S_{iL} \leq S_{i+1,L}$; and wherein the computing mechanism is configured to establish interval roots for F(x) from the interval entries in list L.

* * * * *

UNITED STATES PATENT AND TRADEMARK OFFICE
CERTIFICATE OF CORRECTION

PATENT NO. : 6,895,422 B2
DATED : May 17, 2005
INVENTOR(S) : G. William Walster

It is certified that error appears in the above-identified patent and that said Letters Patent is hereby corrected as shown below:

Column 9,
Line 10, please delete the equation, "$A_L>0$" and replace with the equation -- $A_L=0$ --.
Line 27, please delete the sentence "A computer-controlled method for finding the roots of a polynomial equation with interval coefficients, comprising" and replace with the paragraph -- A computer-readable storage medium storing instructions that when executed by a computer cause the computer to perform a method for finding the roots of a polynomial equation with interval coefficients --.
Line 36, please delete the sentence "storing the representation in a computer memory".

Column 10,
Lines 19, 21 and 23, please delete the word "establishing" and replace it with the word -- establish --.
Line 22, please delete the word "and" and replace it with the words -- and to --.
Line 33, please delete the equation "$F_4 x$" and replace it with the equation -- $F_4(x)$ --.

Column 11,
Line 7, please delete the equation "$(A_{(2kU} x^{2k})$" and replace it with the equation -- $(A_{2kU} x^{2k})$ --.

Signed and Sealed this

Twenty-seventh Day of September, 2005

JON W. DUDAS
*Director of the United States Patent and Trademark Office*